United States Patent
El Ferik et al.

(10) Patent No.: US 10,235,626 B2
(45) Date of Patent: *Mar. 19, 2019

(54) NONLINEARLY COMPENSATED VALVE SYSTEM

(71) Applicants: KING FAHD UNIVERSITY OF PETROLEUM AND MINERALS, Dhahran (SA); YOKOGAWA SAUDI ARABIA COMPANY, Al-Khobar (SA)

(72) Inventors: Sami El Ferik, Dhahran (SA); Mohammed Abdeen Mohammed Hassan, Khartoum (SD); Zaid Jamal Albarghouthi, Dhahran (SA); Mohammed Sabih, Dhahran (SA); Mustafa Al-Naser, Dhahran (SA); Mohammed Mahmoud Abd El Samie Mohamed Ali, Dhahran (SA)

(73) Assignees: King Fahd University of Petroleum and Minerals, Dhahran (SA); Yokogawa Saudi Arabia Company, Al-Khobar (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,923

(22) Filed: Apr. 30, 2018

(65) Prior Publication Data
US 2018/0247202 A1   Aug. 30, 2018

Related U.S. Application Data

(63) Continuation of application No. 14/978,607, filed on Dec. 22, 2015, now Pat. No. 9,978,016.

(51) Int. Cl.
*G06F 19/00* (2018.01)
*G06N 3/12* (2006.01)
(Continued)

(52) U.S. Cl.
CPC ......... *G06N 3/126* (2013.01); *F16K 31/1262* (2013.01); *G05B 13/041* (2013.01)

(58) Field of Classification Search
CPC .... G06N 3/126; F16K 31/1262; G05B 13/041
See application file for complete search history.

(56) References Cited

U.S. PATENT DOCUMENTS 6,286,532 B1 * 9/2001 van Nieuwstadt ............ F16K 31/0675 137/1
6,644,332 B1 * 11/2003 Winkler ............ F15B 9/09 137/2

(Continued)

FOREIGN PATENT DOCUMENTS

GB  2465774 A  6/2010

OTHER PUBLICATIONS

Alina Voda, et al., "High Performance Position Tracking With Friction Compensation for an Electro-Pneumatical Actuator", CEAI, Control Engineering and Applied Informatics, vol. 6, No. 2, 2004, pp. 15-33.

(Continued)

*Primary Examiner* — Michael D Masinick
(74) *Attorney, Agent, or Firm* — Oblon, McClelland, Maier & Neustadt, L.L.P.

(57) ABSTRACT

A pneumatic valve system that includes an actuator that pneumatically actuates a valve, and circuitry that calculates a control signal to control the actuator by compensating for nonlinear dynamic of the actuator using a stable inverse model of the valve, optimizes parameters of the stable inverse model such that a difference between output information of the pneumatic valve system and desired reference information is reduced, and outputs the control signal to control the actuator.

9 Claims, 21 Drawing Sheets

(51) Int. Cl.
*G05B 13/04* (2006.01)
*F16K 31/126* (2006.01)

(56) References Cited

U.S. PATENT DOCUMENTS

| | | | | |
|---|---|---|---|---|
| 9,488,974 B2* | 11/2016 | Song | ............. | G05B 19/4142 |
| 2007/0288103 A1* | 12/2007 | Choudhury | ........ | G05B 23/0229 |
| | | | | 700/35 |
| 2008/0236679 A1* | 10/2008 | Esposito | ............. | F16K 7/14 |
| | | | | 137/487.5 |
| 2011/0307438 A1* | 12/2011 | Fernández Martínez | ............. | |
| | | | | G06N 7/005 |
| | | | | 706/52 |
| 2012/0046793 A1* | 2/2012 | Song | ............. | G05B 19/4142 |
| | | | | 700/282 |

OTHER PUBLICATIONS

X. Chen and M. Tomizuka, "Optimal plant shaping for high bandwidth disturbance rejection in discrete disturbance observers," Proceedings of the 2010 American Control Conference, Baltimore, MD, 2010, pp. 2641-2646.

Li, X, et al.,"Data-Driven Modelling of Control Valve Stiction Using Revised Binary-Tree Structure", Industrial & Engineering Chemistry Research 2015 54 (1), 330-337.

Durand, H. E. (2017). Economic Model Predictive Control and Nonlinear Control Actuator Dynamics. UCLA: Chemical Engineering 0294. Retrieved from: http://scholarship.org/uc/item/7b0653hp.

* cited by examiner

| # | Component | Function |
|---|---|---|
| 1 | Water pump | To keep water circulation on the system, elevating water from bottom tank into controlled level tank through pneumatic valve. |
| 2 | Solenoid valve | To give control over the tank outlet. |
| 3 | Pneumatic valve | The valve under study. |
| 4 | Level transducer | Continuously measuring water tank level and sends the readings to main controller |
| 5 | Controller: NI compact field point+I/O modules | Act as the level controller, it is programmable controller which can programmed using LabView software, PID controller and all required signal conditioning is done easily,even the valve stiction model is programmed to let the valve act as it has stiction on its own. |
| 6 | LabView | To program the NI controller, also act as HMI for operation. |

FIG. 22

NONLINEARLY COMPENSATED VALVE SYSTEM

CROSS-REFERENCE TO RELATED APPLICATIONS

The present application is a Continuation of Ser. No. 14/978,607, having a filing date of Dec. 22, 2015.

BACKGROUND

Field of the Disclosure

A typical chemical plant has hundreds or thousands of control loops, and thus to increase the performance and reliability of the entire control loop becomes more important as optimization of chemical process industries becomes financially more motivated. The present disclosure relates to pneumatic valve system to increase the performance and/or reliability of the entire control loop of a plant.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Among other things, the present disclosure provides a pneumatic valve system that includes an actuator that pneumatically actuates a valve, and circuitry that calculates a control signal to control the actuator by compensating for nonlinear dynamic of the actuator using a stable inverse model of the valve, optimizes parameters of the stable inverse model such that a difference between output information of the pneumatic valve system and desired reference information is reduced, and outputs the control signal to control the actuator.

BRIEF DESCRIPTION OF THE DRAWINGS

The patent or application file contains at least one drawing.

A more complete appreciation of the disclosure and many of the attendant advantages thereof will be readily obtained as the same becomes better understood by reference to the following detailed description when considered in connection with the accompanying drawings, wherein:

FIG. 22 is an exemplary table including experimental setup components and its functions according to one embodiment.

DETAILED DESCRIPTION OF THE EMBODIMENTS

Figure 1:
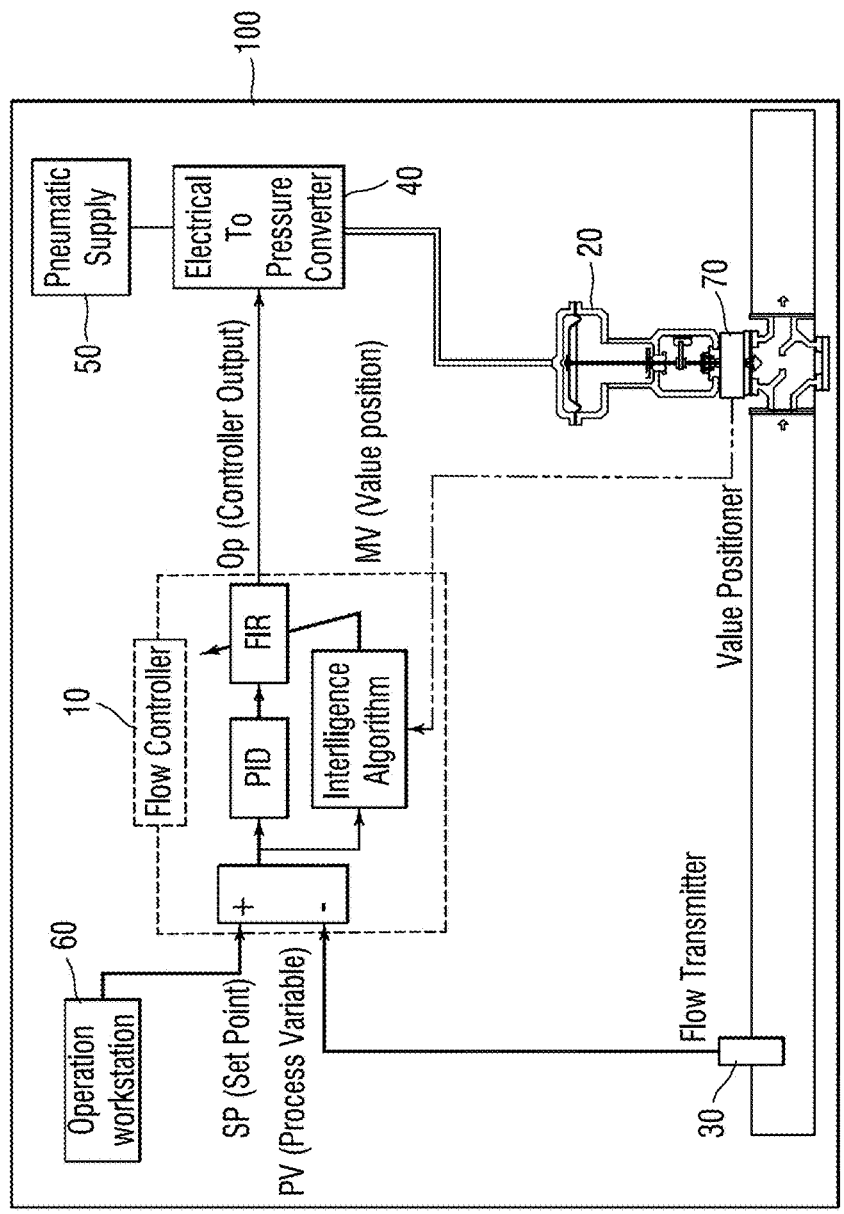
FIG. 1 is an exemplary pneumatic valve system according to one embodiment.

The present disclosure relates to a pneumatic valve stiction compensation technology. "Stiction" is an abbreviation of two words "static friction," and the friction is known as a natural resistance to relative motion between two contacting bodies.

ISA (Instrument Society of America) defines the stiction as follows: "Stiction is the resistance to the start of motion, usually measured as the difference between the driving values required overcoming static friction upscale and downscale."

Entech defines the stiction as follows: "Stiction is a tendency to stick-slip due to high static friction. The phenomenon causes a limited resolution of the resulting control valve motion. ISA terminology has not settled on a suitable term yet. Stick-slip is the tendency of a control valve to stick while at rest, and to suddenly slip after force has been applied."

Horch defines the stiction as follows: "The control valve is stuck in a certain position due to high static friction. The (integrating) controller then increases the set point to the valve until the static friction can be overcome. Then the valve breaks off and moves to a new position (slip phase) where it sticks again. The new position is usually on the other side of the desired set point such that the process starts in the opposite direction again."

Ruel defines the stiction as follows: "Stiction as a combination of the words stick and friction, created to emphasize the difference between static and dynamic friction. Stiction exists when the static (starting) friction exceeds the dynamic (moving) friction inside the valve. Stiction describes the valve's stem (or shaft) sticking when small changes are attempted. Friction of a moving object is less than when it is stationary. Stiction can keep the stem from moving for small control input changes, and then the stem moves when there is enough force to free it. The result of stiction is that the force required to get the stem to move is more than is required to go to the desired stem position. In presence of stiction, the movement is jumpy."

Further, details of stiction and nonlinear dynamic of a pneumatic actuator are to be mentioned later in reference to FIG. 7, which summarizes real process data and a new definition of stiction proposed by the authors ((Choudhury, Shah, Thornhill, & Shook, 2006).

Process valves are the most fundamental actuators in chemical engineering control applications and the control strategy used by these valves are variations on linear Proportional-Integral-Derivative (PID) control.

Oscillatory feedback control loops are a common occurrence due to poor controller tuning, control valve stiction, poor process and control system design, and oscillatory disturbances (Bialkowski, 1992; Ender, 1993; Miao & Dale, 1999). Bialkowski reported that about 30% of the loops are oscillatory due to control valve problems.

The only moving part in a control loop is a control valve. If the control valve contains nonlinearities (e.g., stiction, backlash, and deadband), the valve output may be oscillatory, which in turn can cause oscillations in the process output. Among the many types of nonlinearities in control valves, stiction is the most common and one of the long-standing problems in the process industry.

In the process industry, stiction is generally measured as a percentage of the valve travel or the span of the control signal (Gerry & Ruel, 2001). For example, a 2% stiction means that when the valve gets stuck it will start moving only after the cumulative change of its control signal is greater than or equal to 2%. If the range of the control signal is 4-20 mA then a 2% stiction means that a change of the control signal less than 0.32 mA in magnitude will not be able to move the valve.

The present disclosure relates to pneumatic valve system to increase the performance and/or reliability of the entire control loop of a plant taking account for the nature of stiction.

Figure 3:
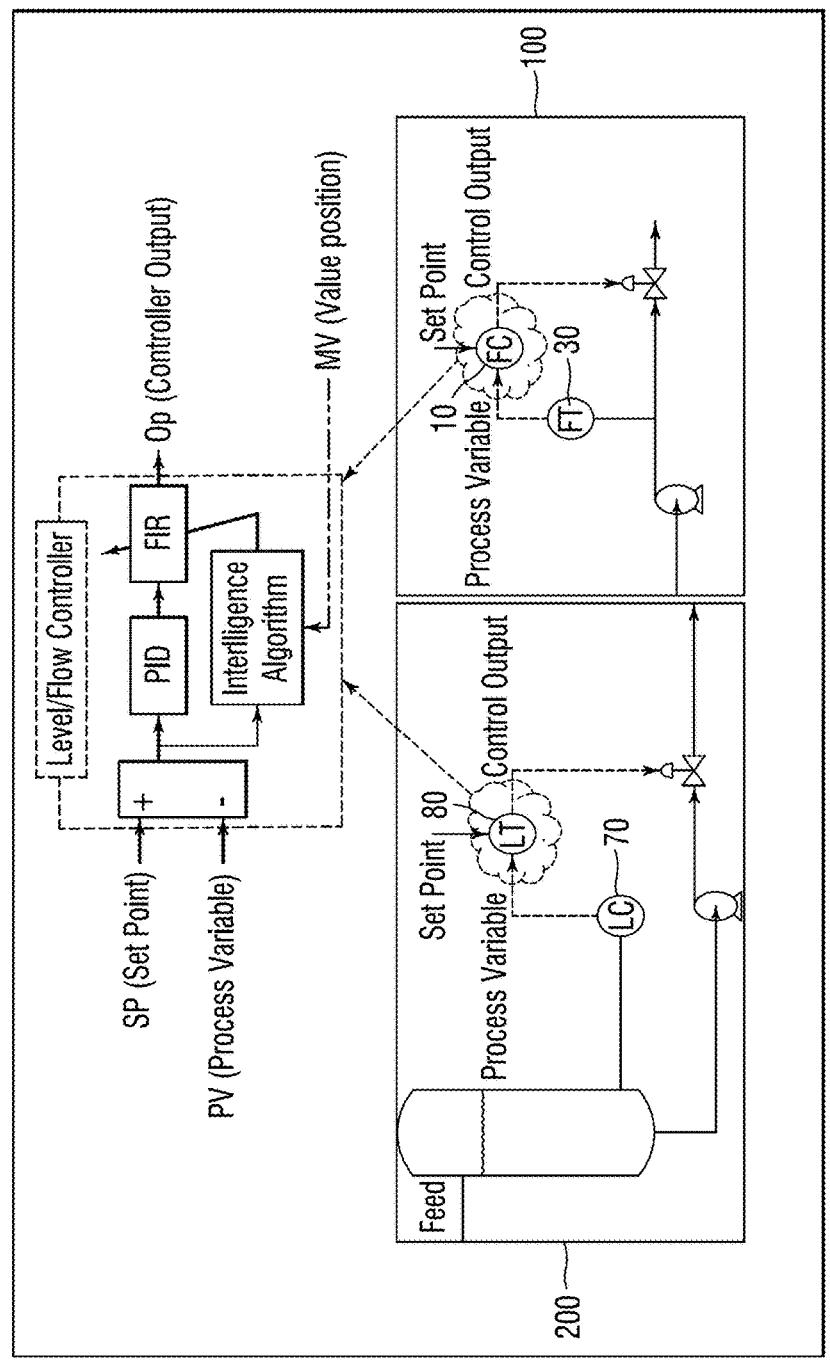
FIG. 3 is an exemplary pneumatic valve system according to one embodiment.

Referring now to the drawings, wherein like reference numerals designate identical or corresponding parts throughout the several views, FIG. 1 is an exemplary pneumatic valve system 100 according to one embodiment. Controller 10 is a controller that calculates a control signal to control pneumatic actuator 20. In this embodiment, controller 10 is a flow controller that control pneumatic actuator 20 based on flow information (e.g., flow speed or flow amount of substance) of substance flowing into or out of a valve actuated by pneumatic actuator 20. However, as shown in the embodiment of FIG. 3, controller 10 can be a level controller that controls pneumatic actuator 20 based on level information (e.g., height or amount of substance) of the substance in a tank connected to the valve. The control signal (controller output: OP) output from the flow controller 10 is input to electrical to pressure converter 40, and electrical to pressure converter 40 controls pneumatic pressure supplied from pneumatic supplier 50 based on the control signal (controller output: OP) to control pneumatic actuator 20. Sensor 30 detects output information of pneumatic valve system 100. For example, in this embodiment, sensor 30 is a flow transmitter that detects the flow information of the substance, and outputs the flow information as the output information of pneumatic valve system 100. As shown in the embodiment of FIG. 3, sensor 30 can be a level transmitter that detects the level information of the substance, and outputs the level information as the output information of pneumatic valve system 100. Further, pneumatic valve system 100 may include (smart) valve positioner 70 (pneumatic or electrical base positioner) that detects a position of the valve to output position information of the valve. The valve positioner 70 may include a microprocessor to perform a simple control loop (i.e., local Proportional-Integral-Derivative (PID) controller).

Controller 10 calculates the control signal by compensating for nonlinear dynamic of the pneumatic actuator 20 using a stable inverse model of the valve. The nonlinear dynamic of the pneumatic actuator 20 is caused by a static friction (stiction), which also causes a stick and jump valve behavior, of the valve. Details of the nonlinear dynamic of the pneumatic actuator 20 are to be mentioned later in reference to FIG. 7. Controller 10 may use a finite impulse response (FIR) filter to calculate the control signal.

Further, controller 10 optimizes parameters of the stable inverse model such that a difference between the output information (process variable: PV (e.g., the flow information or the level information) or valve position information: MV) of the pneumatic valve system and desired reference information is reduced.

If the pneumatic valve system 100 includes valve positioner 70, the smart positioner can send the valve position information (MV) to controller 10, or can do the optimization process locally if it has the capability. The objective need to be reduced or minimized is the sum of square error which is the difference between Proportional-Integral-Derivative (PID) control signal (controller output: OP) and the valve position information (MV).

If the pneumatic valve system 100 does not include valve positioner 70, or if the positioner does not include processing or communication ability, the same procedure can be done at the controller 10 by reducing or minimizing the error, which is the difference between desired reference information (set point: SP) and the process variable (PV) (e.g., the flow information or the level information). The desired reference information (set point: SP) is, for example, input to controller 10 from operation workstation 60 (user interface, such as a personal computer) or stored in a memory of controller 10.

In one embodiment, the finite impulse response (FIR) filter used for the compensation algorithm is preferred to have a few numbers of weights to reduce the time and processing load needed for optimization process. There is no specific rule for filter selection, but by starting with small number (typically four) and optimizing with suitable parameters, the designer can select the minimum number.

Controller 10 may optimize the parameters of the stable inverse model to reduce a cyclic behavior in the control signal. Further, controller 10 may optimize the parameters of the stable inverse model using a differential evolution (DE) algorithm due to its simplicity and robustness, and/or at least one of a genetic algorithm, a particle swarm optimization algorithm, and an ant colony optimization algorithm.

Further, controller 10 may optimize the parameters of the stable inverse model taking into account system degradation of the pneumatic valve system, or unknown nonlinear dynamics based on information received via network.

Accordingly, the pneumatic valve system 100 and the method provides improvement to oscillatory loop by creating the inverse dynamic of sticky valve, resulting in overall semi linear transfer function.

Figure 2:
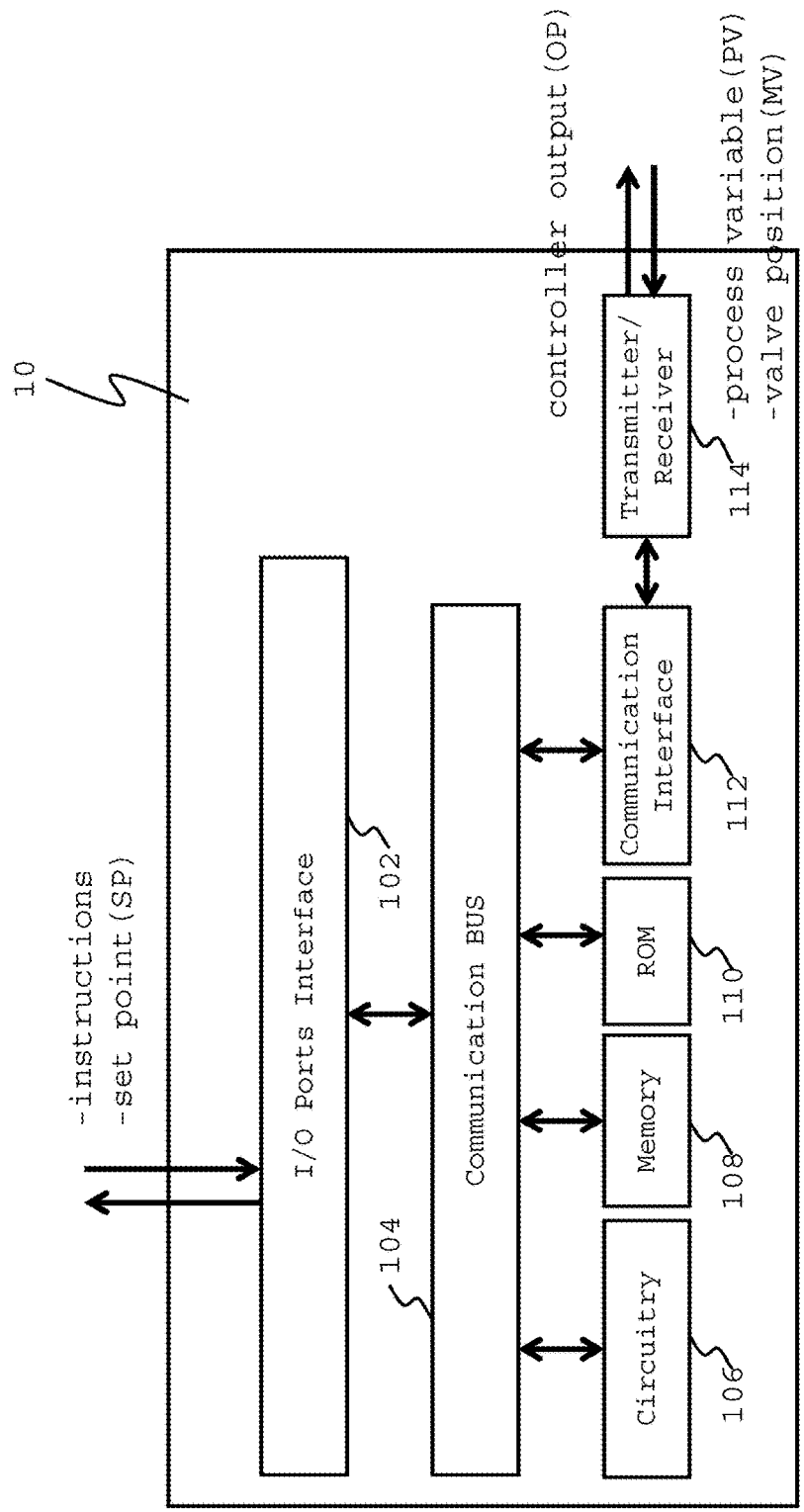
FIG. 2 is an exemplary controller of the pneumatic valve system according to one embodiment.

FIG. 2 is an exemplary controller 10 of the pneumatic valve system according to one embodiment. Controller 10 includes I/O ports interface 102 to exchange data with operation workstation 60 (e.g., receive instructions or set point information from operation workstation 60, or output current status information of the valve to the operation workstation 60). The I/O ports interface 102 may include logic to interpret the device address generated by circuitry 106. The I/O ports interface 102 may also include a handshaking logic so that the circuitry 106 can communicate with operation workstation 60 through the interface. The I/O ports interface 102 is also connected to communication BUS 104. Communication BUS 104 is also connected to circuitry 106, memory 108, ROM 110 and communication interface 112. Communication BUS 104 stores information and instructions to be executed by the circuitry 106 and manages the signal transaction between each component in controller 10. The communication BUS 104 may include a data bus to carry information, an address bus to determine where the information should be sent and a control bus to determine its operation.

Circuitry 106, such as a processing circuitry or a CPU, executes one or more sequences of one or more instructions contained in a memory, such as memory 108. Such instructions may be read into memory 108 from another computer readable medium, such as a hard disk or removable media drive. One or more processors in a multi-processing arrangement may also be employed to execute the sequences of instructions contained in memory 108. In alternative embodiments, hard-wired circuitry may be used in place of or in combination with software instructions. Thus, embodiments are not limited to any specific combination of hardware circuitry and software.

As stated above, controller 10 includes at least one computer readable medium or memory, such as memory 108, for holding instructions programmed according to the teachings of the present disclosure and for containing data structures, tables, records, or other data described herein. Examples of non-transitory storage device are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read.

Stored on any one or on a combination of computer readable medium, the present disclosure includes software for controlling pneumatic actuator 20 in pneumatic valve system 100. Such software may include, but is not limited to, device drivers, operating systems, development tools, and applications software. Such computer readable medium further includes the computer program product of the present disclosure for performing all or a portion (if processing is distributed) of the processing performed in implementing the disclosure.

The computer code devices of the present disclosure may be any interpretable or executable code mechanism, including but not limited to scripts, interpretable programs, dynamic link libraries (DLLs), Java classes, and complete executable programs. Moreover, parts of the processing of the present disclosure may be distributed for better performance, reliability, and/or cost.

The term "computer readable medium" as used herein refers to any non-transitory or transitory medium that participates in providing instructions to the circuitry 106 for execution. A computer readable medium may take many forms, including but not limited to, non-volatile media, volatile media, and transmission media. Non-volatile media includes, for example, optical magnetic disks, and magneto-optical disks, such as the hard disk or the removable media drive. Volatile media includes dynamic memory, such as the memory 108. Transmission media includes coaxial cables, copper wire and fiber optics, including the wires that make up the communication bus 104. Transmission media may also take the form of acoustic or light waves, such as those generated during radio wave and infrared data communications.

Various forms of computer readable media may be involved in carrying out one or more sequences of one or more instructions to circuitry 106 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to controller 10 may receive the data on the phone line and use an infrared transmitter to convert the data to an infrared signal. An infrared detector coupled to the communication bus 104 can receive the data carried in the infrared signal and place the data on the communication bus 104. The communication bus 104 carries data to the memory 108, from which the circuitry 106 retrieves and executes the instructions. The instructions received by the memory 108 may optionally be stored on storage device either before or after execution by circuitry 106.

Memory 108 is any non-transitory storage device such as compact discs, hard disks, floppy disks, tape, magneto-optical disks, PROMs (EPROM, EEPROM, flash EPROM), random access memory (RAM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read and coupled to the communication bus 104 for storing information and instructions by the circuitry 106. In addition, the memory 108 may be used for storing temporary variables or other intermediate information during the execution of instructions by the circuitry 106.

Controller 10 further includes a read only memory (ROM) 110 or other static storage device (e.g., programmable ROM (PROM), erasable PROM (EPROM), and electrically erasable PRM (EEPROM)) coupled to the communication bus 104 for storing static information and instructions for the circuitry 106.

Controller 10 may also include a communication interface 112 coupled to the communication BUS 104. The communication interface 112 provides a two-way data communication coupling to a network link that is connected to, for example, wireless communication network (e.g., cellular networks or wireless LAN) connected to the network 70. In any such implementation, the communication interface 112 sends and/or receives electrical, electromagnetic or optical signals that carry digital data streams representing various types of information (e.g., controller output (OP), process variable (PV), valve position information (MV)). The communication interface 114 may be further connected to a transmitter/receiver 114 including a transmitter and a receiver.

The network link typically provides data communication through one or more networks to other data devices. For example, the network link may provide a connection to a server (not shown), electrical to pressure converter 40, valve positioner 70, flow transmitter 30, or operation workstation 60. Controller 10 may transmit and/or receive data, including program code, through the network(s), the network link, the transmitter/receiver 114 and the communication interface 112. Circuitry 106 may control the transmitter/receiver 114 to transmit the control signal (controller output: OP) through the network to electrical to pressure converter 40. Circuitry 106 may control the transmitter/receiver 114 to receive information from flow transmitter 30, valve positioner 70, or operation workstation 60 through the network, and calculate the control signal (controller output: OP) based on the received information.

FIG. 3 is an exemplary pneumatic valve system 200 according to one embodiment. As described above, controller 10 in FIG. 1 is a flow controller that control pneumatic actuator 20 based on flow information (e.g., flow speed or flow amount of substance) of substance received from flow transmitter 30. In contrast, the controller 10 can be a level controller 80 that controls pneumatic actuator 20 based on level information (e.g., height or amount of substance) of the substance in a tank connected to the valve. The level information is detected by a sensor (e.g., a level transmitter 70) and transmitted to level controller 80.

Figure 4:
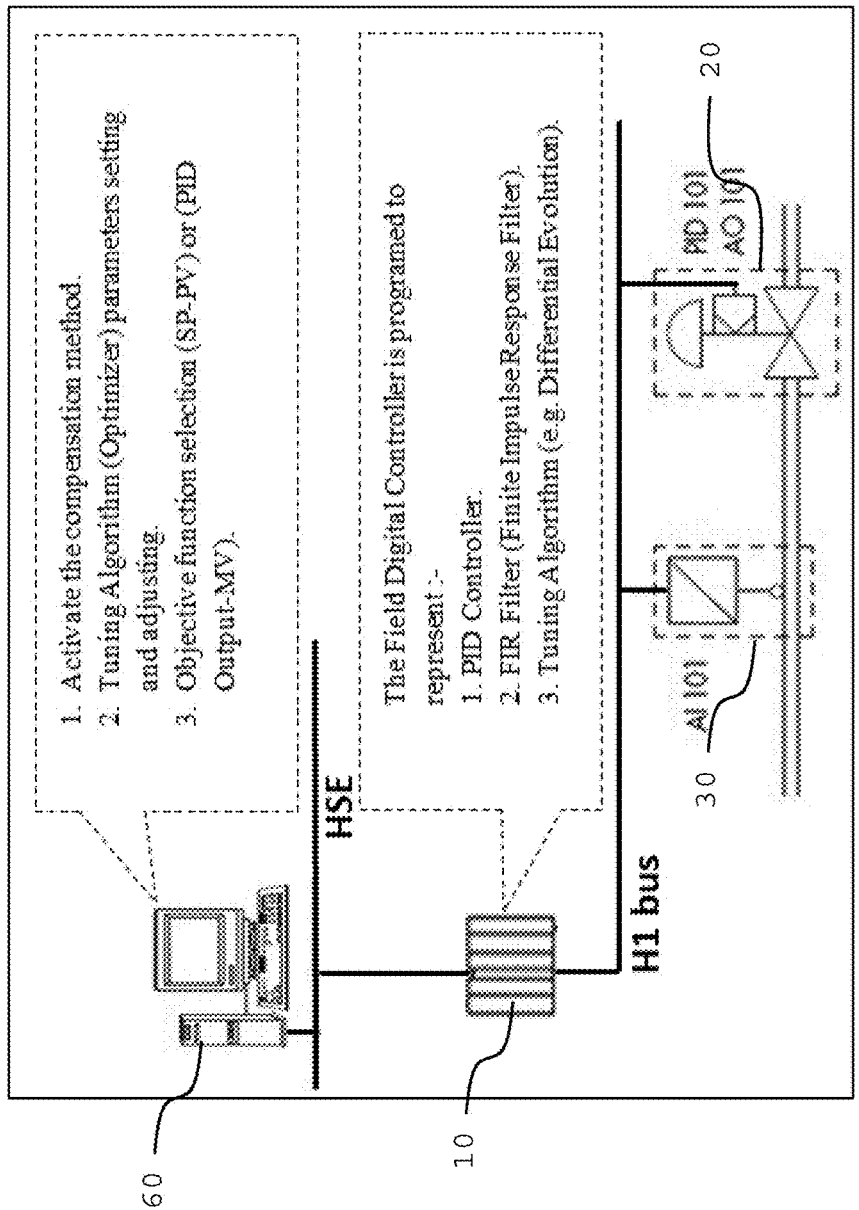
FIG. 4 is an exemplary control system of the pneumatic valve system according to one embodiment.

FIG. 4 is an exemplary control system of the pneumatic valve system according to one embodiment. Operation workstation 60 functions as a user interface of controller 10 to provide necessary instructions with the controller 10. For example, operation workstation 60 activates a compensation method to compensate for nonlinear dynamic of pneumatic actuator 20 as performed by controller 10, tunes settings of the parameters of the stable inverse model of the valve, and selects objective functions (e.g., select between a first function using a difference between set point (SP) and process variable (PV) and a second function using a difference between Proportional-Integral-Derivative (PID) output information and valve position information (MV) to optimize the parameters of the stable inverse model).

Controller 10 is programmed to function as, for example, a linear Proportional-Integral-Derivative (PID) controller and a finite impulse response (FIR) filter, and perform tuning algorithm to optimize the parameters of the stable inverse model using, for example, a different evolution (DE) algorithm.

Controller 10 calculates and transmits a control signal to control pneumatic actuator 20, and output information of pneumatic valve system 100 (e.g., flow information) is detected and transmitted from a sensor 30 (e.g., flow transmitter) to controller 10.

Figure 5:
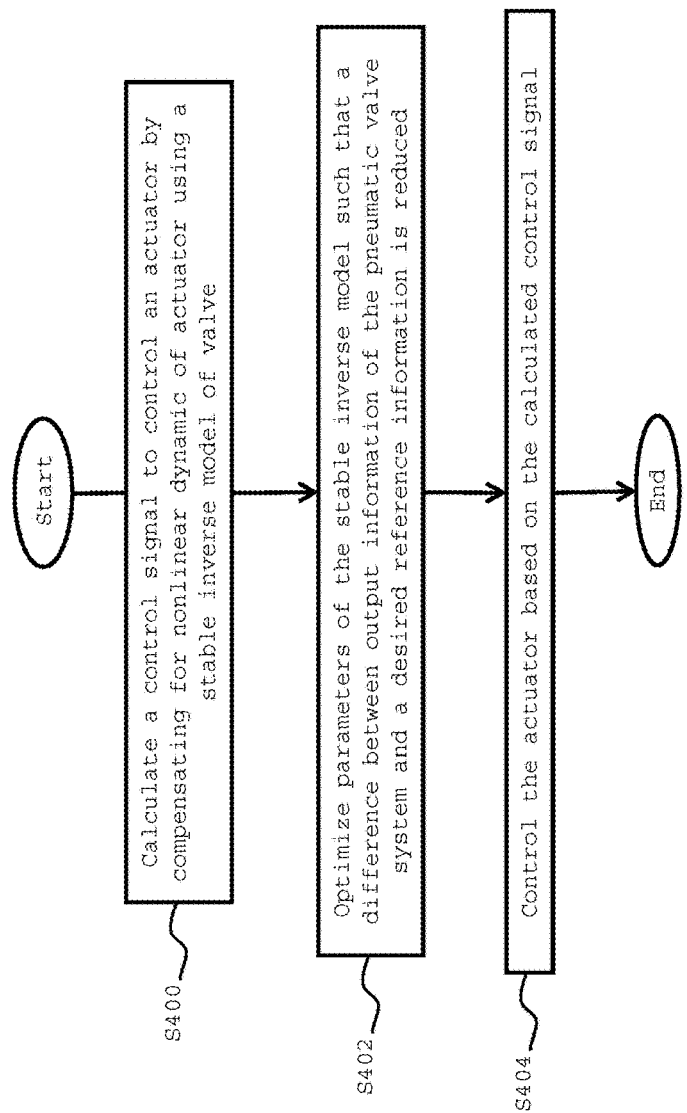
FIG. 5 is an exemplary flowchart of the pneumatic valve system according to one embodiment.

FIG. 5 is an exemplary flowchart of pneumatic valve system 100 according to one embodiment. At step 400, controller 10 calculates a control signal to control actuator 20 by compensating for nonlinear dynamic of actuator 20 using a stable inverse model of the valve.

At step 402, controller 10 optimizes parameters of the stable inverse model such that a difference between output information of the pneumatic valve system and a desired reference information is reduced.

At step 404, controller 10 controls the actuator based on the calculated control signal.

Figure 6:
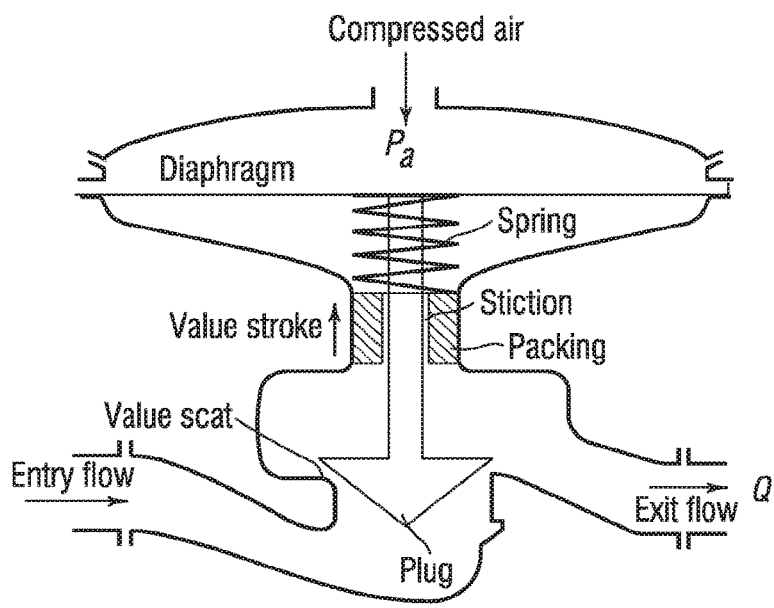
FIG. 6 is exemplary components of a pneumatic valve according to one embodiment.

FIG. 6 is exemplary components of pneumatic valve according to one embodiment. The major components of the pneumatic valve include a valve body housing, an actuation unit, and accessories. The valve body consists of a valve seat. A valve plug is attached to a valve stem. The clearance between the valve plug and the seat ring determines the flow-rate of the fluid. The actuator is pneumatic in this case. The stem is connected to a diaphragm in the actuation unit. There is a spring in the bottom of the diaphragm to balance the control force. The accessories include, for example, positioners, I/P (current to pressure) transducers, and position sensors. Movements of the diaphragm change in accordance with the control signal transmitted from controller 10. The signal can be generated by a PI controller, and then transformed to proper air pressure by an electric—pneumatic device.

The opening or closing of control valves is done automatically by electrical, hydraulic or pneumatic actuators. Positioners are used to control the opening or closing of the actuator based on electric or pneumatic signals. These control signals are traditionally based on 3-15 psi (0.2-1.0 bar), more common now are 4-20 mA signals for industry, 0-10 V for HVAC systems.

Figure 7:
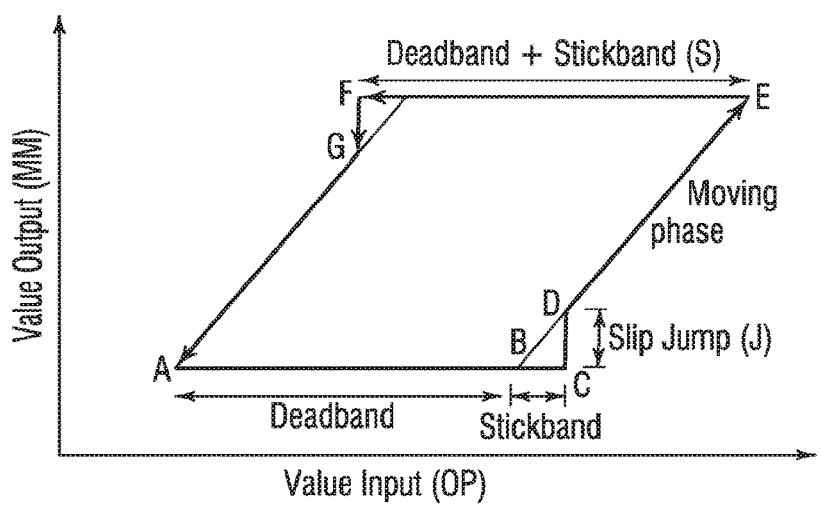
FIG. 7 is an exemplary input-output relation or behavior for sticky valve according to one embodiment.

FIG. 7 is an exemplary input-output relation or behavior for sticky valve according to one embodiment. FIG. 7 summarizes real process data and a new definition of stiction proposed by the authors ((Choudhury, Shah, Thornhill, & Shook, 2006), and describes a phase plot of the input-output behavior of a valve suffering from stiction. The plot consists of four components: deadband, stickband, slip jump, and moving phase. When the valve comes to a rest or changes the direction at point A in the FIG. 7, the valve sticks as it cannot overcome the force due to static friction. After the controller output overcomes the deadband (AB) and the stickband (BC) of the valve, the valve jumps to a new position (point D) and continues to move. Due to very low or zero velocity, the valve may stick again in between points D and E in FIG. 7 while travelling in the same direction. In such a case, the magnitude of deadband is zero and only stickband is present. This can be overcome only if the controller output signal is larger than the stickband. It is usually uncommon in industrial practice. The deadband and stickband represent the behavior of the valve when it is not moving though the input to the valve keeps changing. The slip jump phenomenon represents the abrupt release of potential energy stored in the actuator chambers due to high static friction in the form of kinetic energy as the valve starts to move. The magnitude of the slip jump is very crucial in determining the limit cyclic behavior introduced by stiction. Once the valve jumps or slips, it continues to move until it sticks again (point E). In this moving phase, dynamic friction is present, which may be much lower than the static friction. Therefore, "stiction is a property of an element such that its smooth movement in response to a varying input is preceded by a static part followed by a sudden abrupt jump called 'slip-jump.'" Slip-jump is expressed as a percentage of the output span. Its origin in a mechanical system is static friction, which exceeds the dynamic friction during smooth movement.

Figure 8:
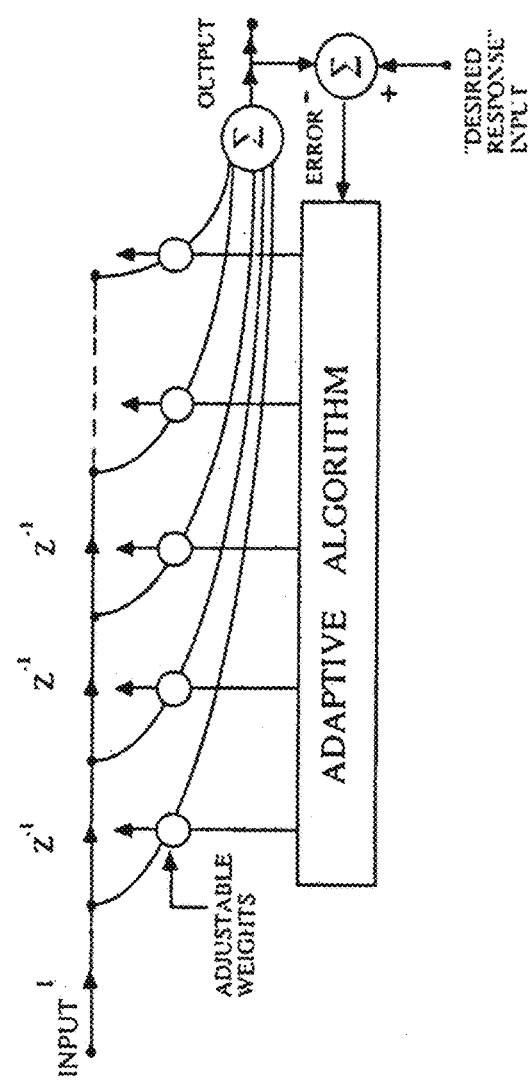
FIG. 8 is an exemplary finite impulse response (FIR) filter with adaptive algorithm for weights adjusting according to one embodiment.

FIG. 8 is an exemplary finite impulse response (FIR) filter with adaptive algorithm for weights adjusting according to one embodiment. An adaptive digital filter in FIG. 8 has an input, an output, and another special input called the "desired response," and the adaptive filter contains adjustable parameters that control its impulse response. The adaptive algorithm is responsible for tuning the adjustable parameters' weight to reduce error or the difference between the plant output and the desired response (or to achieve the minimum error or the minimum difference between the plant output and the desired response). The finite impulse response (FIR) filter has only zeros and no poles.

Adaptive inverse control (AIC) is an important application of adaptive filtering theory. As explained in Widrow's textbook, the adaptive filter can be considered as a building block having an input signal, output signal, and a special input signal called the error which is used in the learning process.

Figure 9:
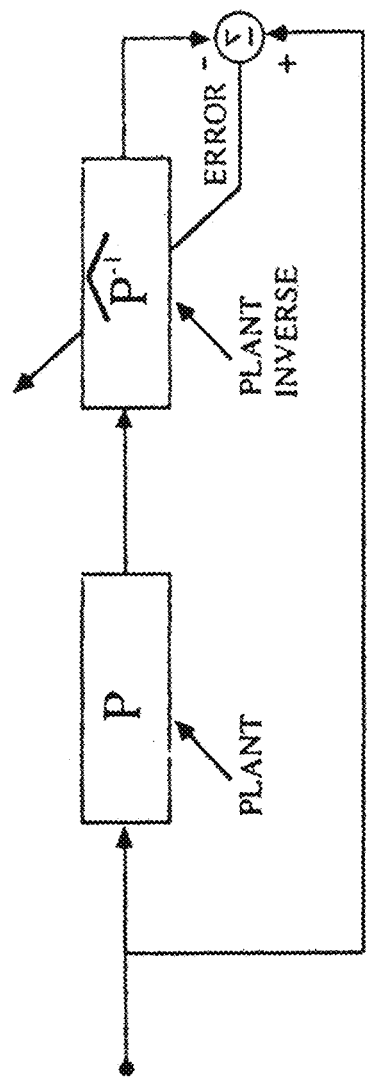
FIG. 9 is an exemplary configuration used for identifying an inverse dynamic model of a plant according to one embodiment.

The form of adaptive filter to be considered here comprises a tapped delay line, variable weights whose input signals are the signals at the delay-line taps, a summer to add the weighted signals, and an adaption process that automatically seeks an optimal impulse response by adjusting the weights. FIG. 9 illustrates these components.

FIG. 9 is an exemplary configuration used for identifying an inverse dynamic model of a plant according to one embodiment. FIG. 9 illustrates the adaptive filter as it would be used to identify the inverse dynamic of unknown plant. If we imagine that this unknown plant is a model for a sticky valve dynamic, the adaptive filter will be the inverse or compensator for the stiction.

The filter in FIG. 9 is causal and has a finite impulse response. The filter is called finite impulse response (FIR) filter (or also called a discrete time or digital filter). The adaptive filter tries to match final output signal to a desire signal by minimizing an error vector. Here, the need for optimization technique or algorithm arises. Typically, least mean square (LMS) algorithm is used to minimize mean square error. The LMS algorithm is good in terms of convergence and simplicity, but as a member of classical optimization method, it does not guarantee achieving and attaining the global minimum, especially for high nonlinearity problem like stiction. Therefore, the use of intelligence optimization technique, such as differential evolution (DE) algorithm, is highly recommended.

The differential evolution (DE) algorithm is introduced by Rainer Storn and Kenneth Price between 1994 to 1996 (Storn, Ag, Sn, Ring, & Price, 1996; Storn & Price, 1995). During his work, to solve a problem called "Chbychev Polynomial fitting problem," Ken made an idea to use vector differences for perturbing the vector population. Then, both worked out this idea and made several improvements, until the differential evolution (DE) algorithm was successfully formulated and introduced.

The differential evolution (DE) algorithm is a population based optimization technique and is characterized by its simplicity, robustness, few control variables and fast convergence. Being an evolutionary algorithm, the differential evolution (DE) technique is suited for solving non-linear and non-differentiable optimization problems.

The differential evolution (DE) algorithm is a kind of searching technique and requires number (NP) of candidate solutions ($X_n^i$) to form the population $G^i$, where each solution consists of certain number of parameters $X_{nj}$ depending on the problem dimension.

$$G^i=[X_1,X_2,\ldots,X_{NP}]L_i \text{ generation,NP population size}$$

$$X_n^i=[X_{n1},X_{n2},\ldots,X_{nj}]n_j \text{ problem dimension}$$

The main idea in any search technique relies on how to generate a variant (offspring) vector solution, based on which the decision will be made, in order to choose the best (parent or variant). The strategy applied in this technique is to use the difference between randomly selected vectors to generate a new solution. For each solution in the original population, a trail solution is generated by performing process of mutation, recombination and selection of operators. The old and new solutions are compared and the best solutions are emerged in the next generation.

Figure 10:
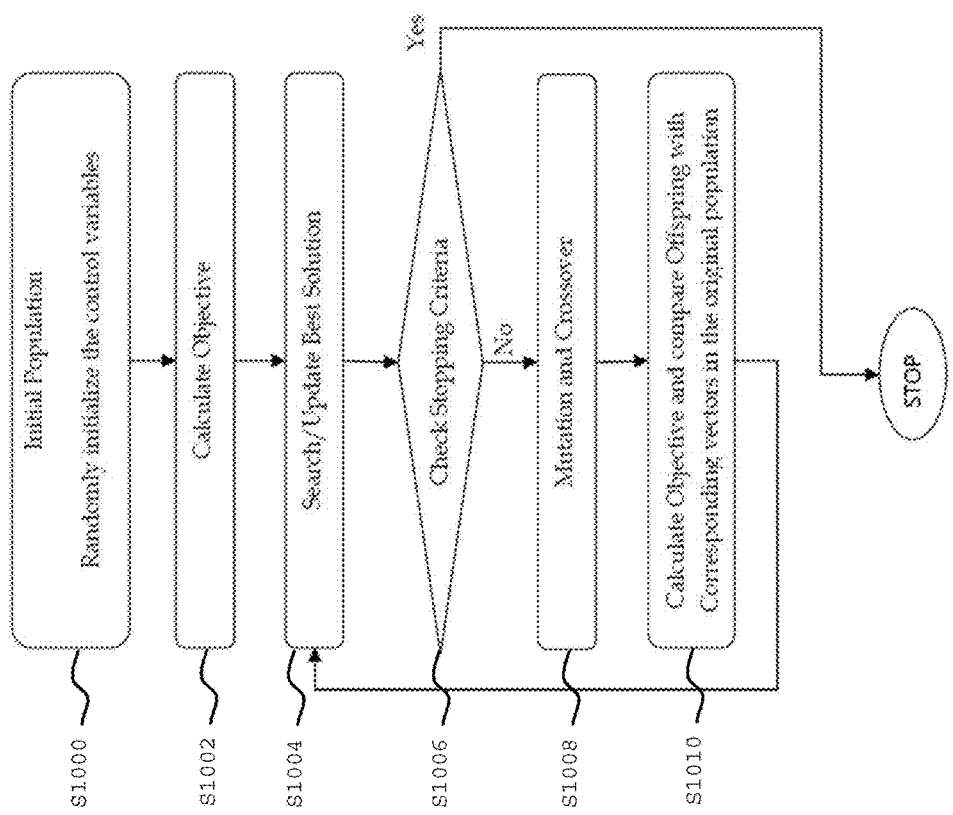
FIG. 10 is an exemplary flowchart for differential evolution (DE) algorithm according to one embodiment.

FIG. 10 is an exemplary flowchart for differential evolution (DE) algorithm according to one embodiment. At step 1000, it starts with (NP) initial population generated randomly between two bounds. Each solution comprises of (D) elements, which is the dimension of the problem, and additional factors (e.g., mutation, cross over rate, number of iteration) must be defined. If the number of solution and iteration get larger, the possibility to reach the global minimum is increased. Here in our problem, the dimension is equivalent to the filter length, and thus we want to optimize the filter weights.

Once the initial population is formed, at step 1002, the objective value for each vector is calculated, and then compared to get the best solution achieving the optimal objective at steps 1004-1010 until stopping criteria is satisfied at step 1006. This value is stored externally and updated by comparison with all solutions in every generation.

The mutation operation is considered as the first step towards the generation of new solutions. At this stage, for every solution (individual) in the population in generation (i): $X_i^{(G)}$ i=1, . . . NP, a mutant vector $V_i^{(G+1)}$ is generated using the following formula:

$$V_i^{(G+1)}=X_i^{(G)}+F(X_{best}^{(G)}-X_i^{(G)})+F(X_{r1}^{(G)}-X_{r2}^{(G)})$$

Where $X_{r1}^{(G)}$, $X_{r2}^{(G)}$, $X_{r3}^{(G)}$, $X_{r4}^{(G)}$, $X_{r5}^{(G)}$ are randomly selected solution vectors from the current generation (different from each other and the corresponding $X_i$) and $X_{best}^{(G)}$ is the solution achieving the best value. F is a mutation constant and it takes values between 1 and 0. The factor F plays a role in controlling the speed of convergence.

To further perturb the generated solutions and enhance the diversity, at step 1008, a crossover operation is applied by the differential evolution (DE) algorithm. In this step the parameters of the generated mutant vector and its corresponding vector i in the original population are copied to a trial solution according to a certain crossover factor CR $\in [1,0]$. For each parameter, a random number in the range [1,0] is generated and compared with CR, and if its value is less than or equal to CR, the parameter value is taken from the mutant vector, otherwise, it will be taken from the parent.

Figure 11:
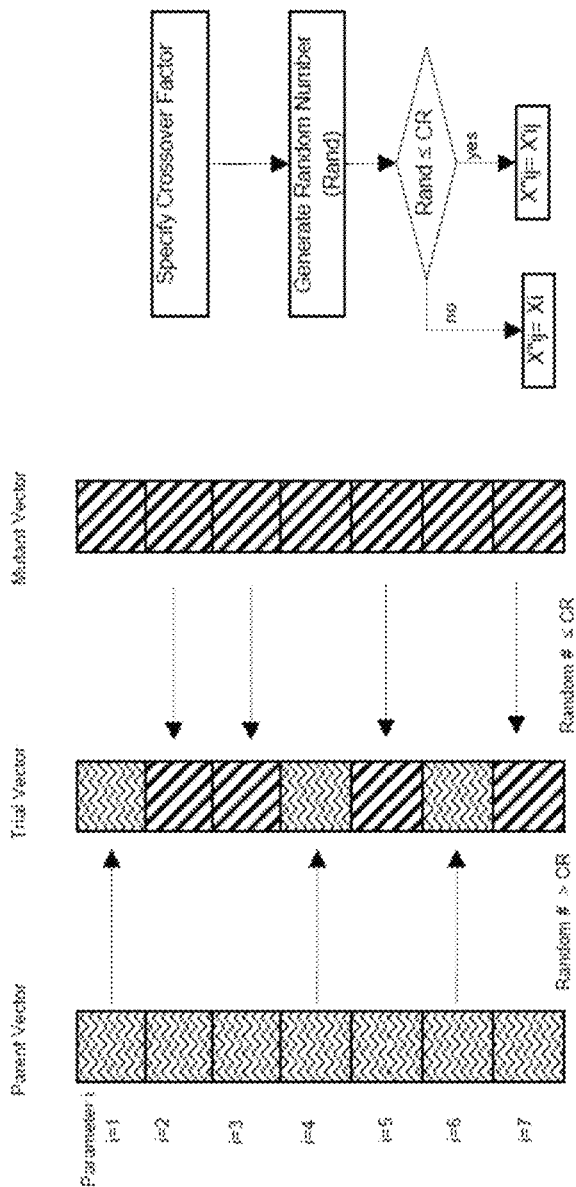
FIG. 11 is an exemplary procedure for differential evolution (DE) algorithm cross over process according to one embodiment.

FIG. 11 is an exemplary procedure for differential evolution (DE) algorithm cross over process according to one embodiment. However, in case CR was defined to be zero, then all the parameters of the trial vector are copied from the parent vector Xi, except one value (randomly chosen) of the trial vector is set equal to the corresponding parameter in the mutant vector. On the other hand, if CR is set equal to one, then all parameters will be copied from the mutant vector, except one value (randomly chosen) of the trial vector is set equal to the corresponding parameter in the parent vector. The factor 'CR' plays a role in controlling the smoothness of the convergence. As CR becomes very small, it becomes very probable that the trial solutions would have characteristic of their parent vectors and therefore, slow the convergence.

The last step 1010 in FIG. 10 toward generation of a new population is to compare the solutions in old population and their corresponding trial solutions and then select the better one. For this, the objective value corresponding to each trial solution is calculated and compared with the value of the parent. If the new solution performs better, it replaces the parent, and otherwise the old solution is retained. Finally the algorithm will terminate after all the iterations are completed.

Figure 12:
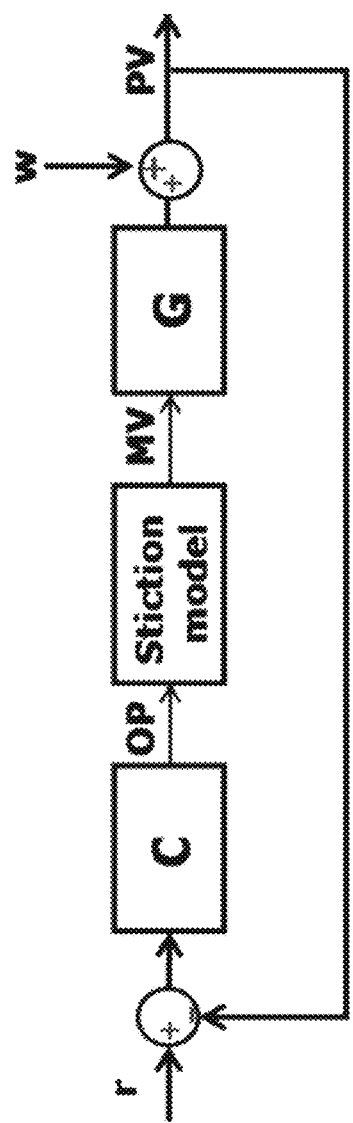
FIG. 12 is an exemplary closed-loop plant with stiction nonlinearity scheme modeled in Hammerstein configuration according to one embodiment.

FIG. 12 is an exemplary closed-loop plant with stiction nonlinearity scheme modeled in Hammerstein configuration according to one embodiment. The effectiveness of the proposed method is illustrated in this example, which is a simulation for configuration shown in FIG. 12.

Figure 13:
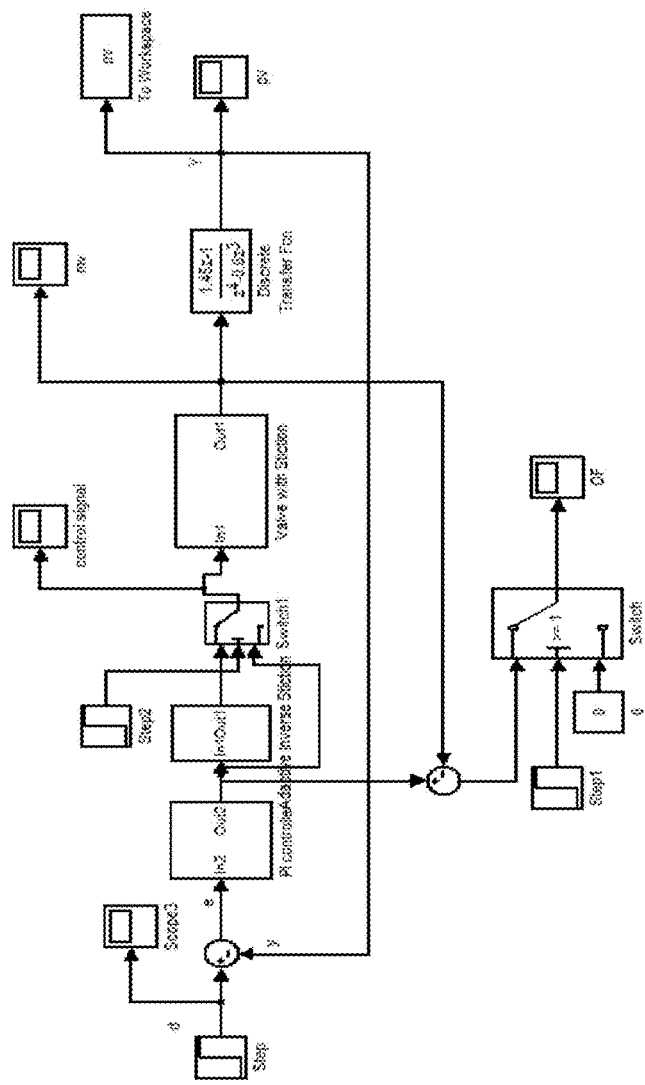
FIG. 13 is an exemplary block for differential evolution (DE) algorithm with Choudhury model and finite impulse response (FIR) filter according to one embodiment.

FIG. 13 is an exemplary block for differential evolution (DE) algorithm with Choudhury model and finite impulse response (FIR) filter according to one embodiment.

The configuration in FIG. 12 is simulated by a simulation software (e.g., Matlab SIMULINK®) and the closed loop SIMULINK® block diagram is shown in FIG. 13, where Choudhury model for valve stiction is used, and differential evolution (DE) algorithm and least mean square (LMS) are used for optimization. The optimization parameters are described below. FIR filter is activated at t=750 in both cases.

<Simulation Parameters>

For both cases using differential evolution (DE) algorithm and least mean square (LMS), the Filter length is four.

DE parameters: Population size=50; Number of iteration or generation=5; Cross Over Rate (CR)=0.5; Mutation Factor (F)=0.5

LMS parameters: Step size=0.05; Leakage Factor=1; Initial conditions: W1=1; W2=W3=W4=0

Figure 14:
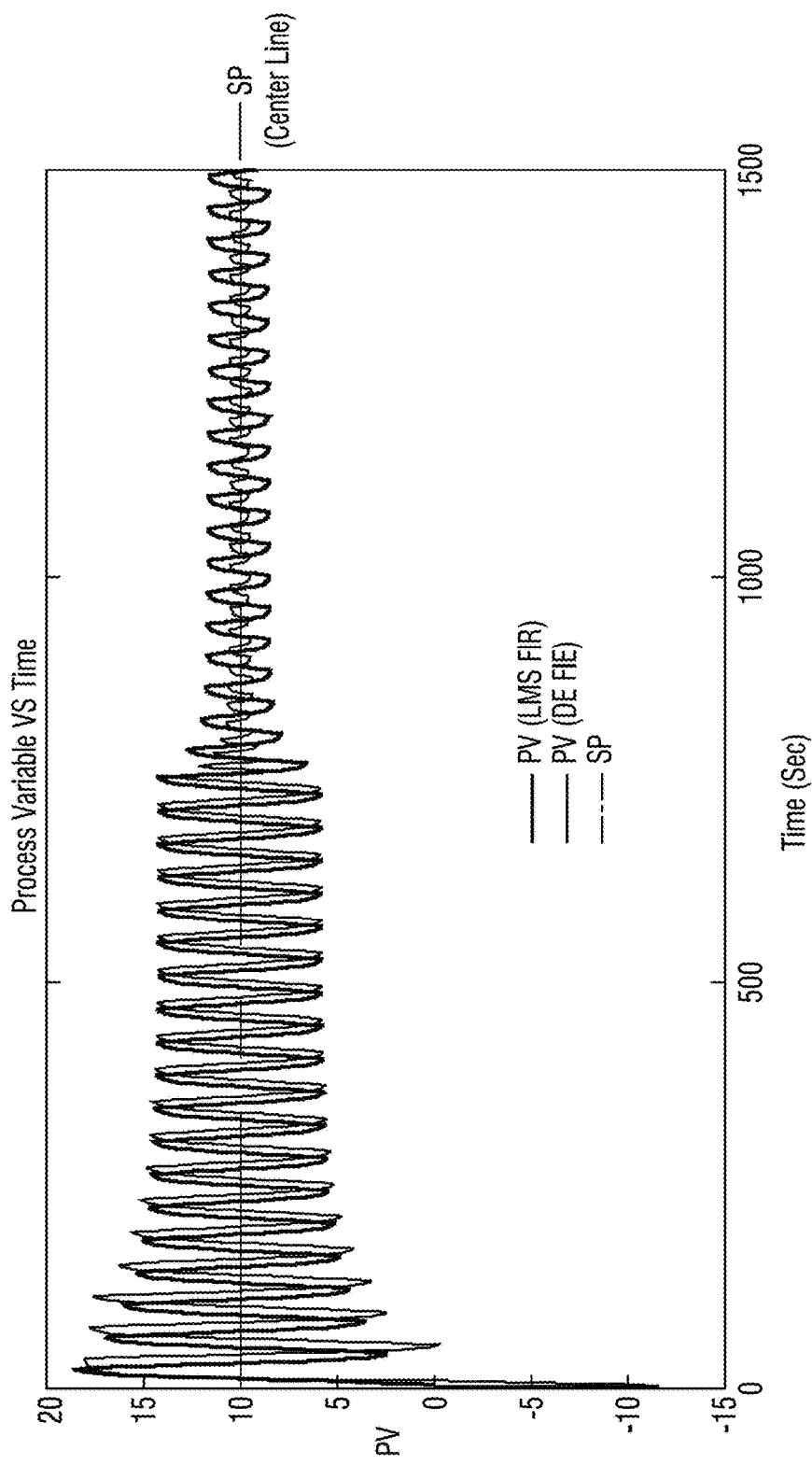
FIG. 14 is an exemplary result for stiction compensation of process variable according to one embodiment using two finite impulse response (FIR) filters: one is optimized by least mean square (LMS) algorithm and the other is optimized by differential evolution (DE) algorithm.

FIG. 14 is an exemplary result for stiction compensation of process variable according to one embodiment using two finite impulse response (FIR) filters: one is optimized by least mean square (LMS) algorithm and the other is optimized by differential evolution (DE) algorithm. As shown in FIG. 14, the FIR filter optimized with differential evolution (DE) algorithm is found to give better compensation result (i.e., the process variable (PV) value becomes closer to set point (SP) value) than that with LMS optimizer as expected from theoretical point of view.

The experimental setup was built to study control valve behavior and to demonstrate the effectives of the differential evolution (DE) filter. A single closed level loop control will be used as a pilot plant, and the water level in tank will be the process variable. The level is measured by level transmitter and fed back to an intelligent controller, which has the ability to communicate with a human machine interface (HMI) in a personal computer. The control signal transmitted from Proportional-Integral-Derivative (PID) that is programmed in the controller will actuate a pneumatic valve through electrical to pressure (E/P) converter. For example, in the experimental setup, the valve can be at good condition and not suffering from stiction, and the stiction can be created or programmed in the controller (soft element) by using stiction model from literature, specifically He models.

Figure 15:
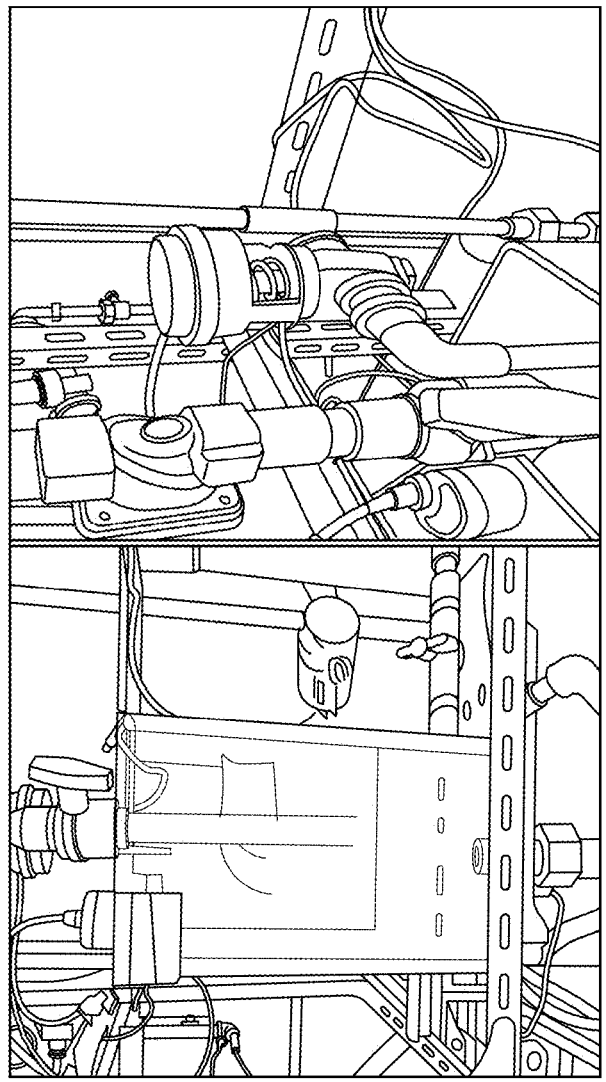
FIG. 15 is an exemplary experimental setup including a tank with level transmitter (left) and pneumatic valve (right) according to one embodiment.

FIG. 15 is an exemplary experimental setup including a tank with level transmitter (left) and pneumatic valve (right) according to one embodiment.

Figure 16:
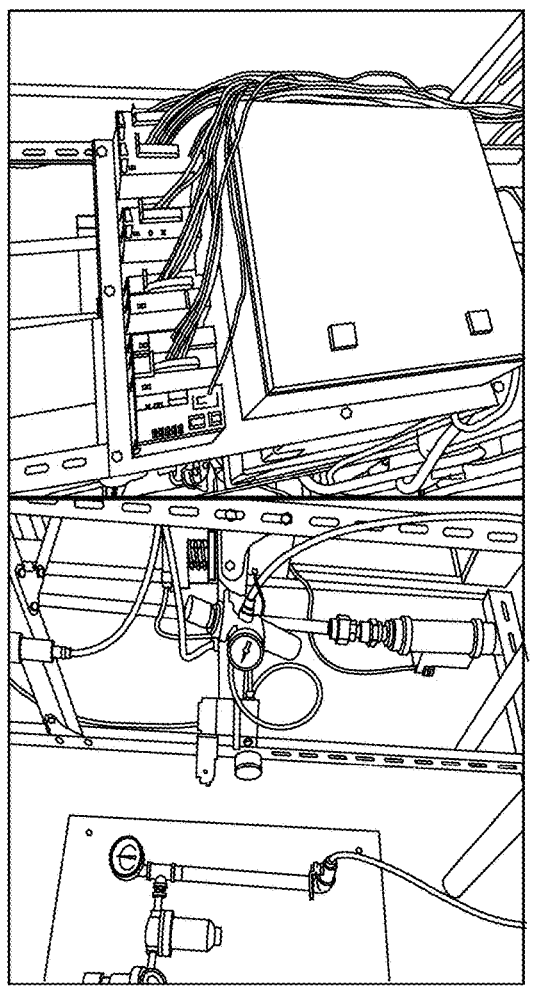
FIG. 16 is an exemplary experimental setup including an electrical to pressure converter (left) and a programmable automation controller (right) according to one embodiment.

FIG. 16 is an exemplary experimental setup including an electrical to pressure converter (left) and a programmable automation controller (right) according to one embodiment.

Figure 17:
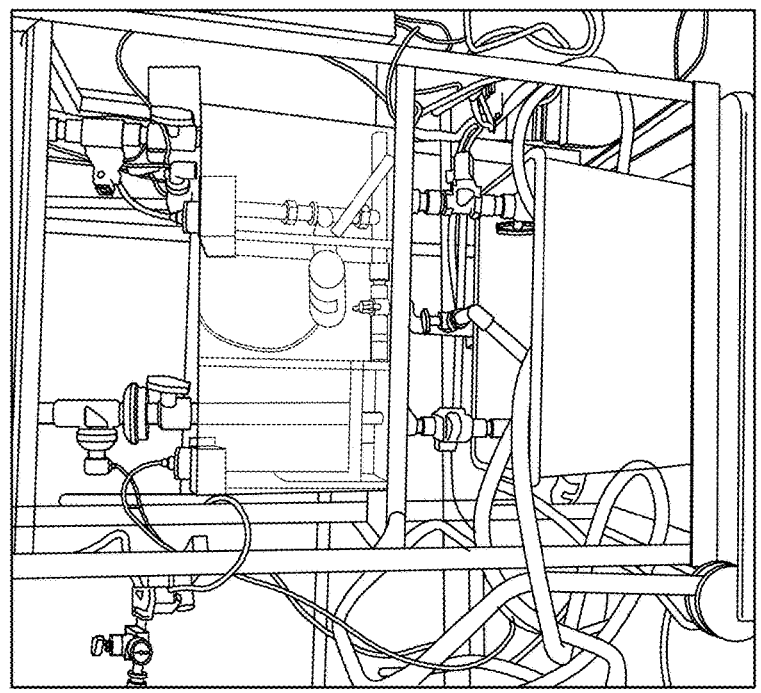
FIG. 17 is an exemplary experimental setup according to one embodiment.

FIG. 17 is an exemplary experimental setup according to one embodiment.

Figure 18:
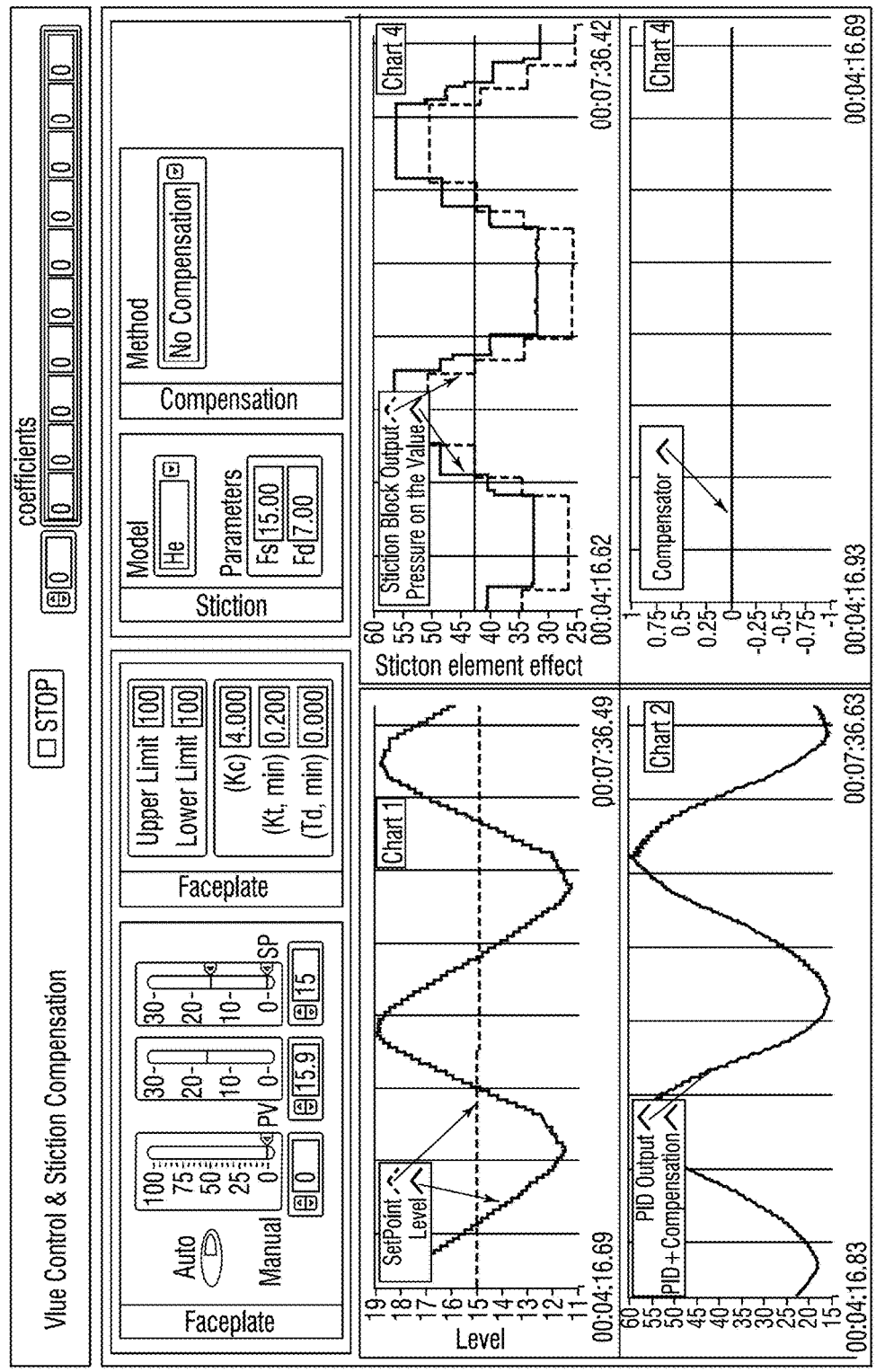
FIG. 18 is an exemplary experimental setup including a human machine interface (HMI) according to one embodiment.

FIG. 18 is an exemplary experimental setup including a human machine interface (HMI) according to one embodiment.

FIG. 22 is an exemplary table including experimental setup components and its functions according to one embodiment.

FIGS. 15-18 and the table in FIG. 22 show the various components of the setup and their functions.

Figure 19:
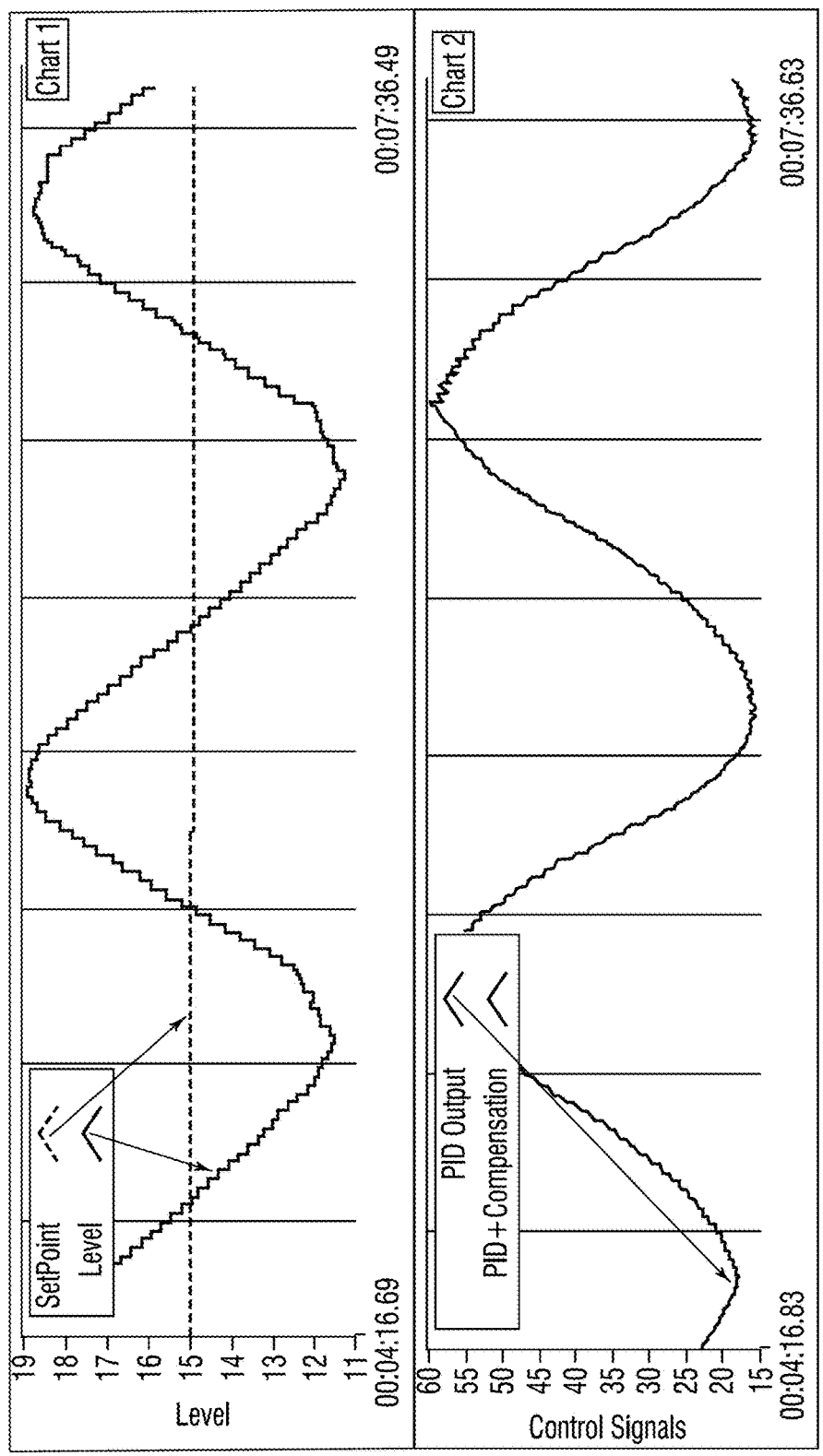
FIG. 19 is an exemplary level and control signal of a sticky valve without compensation according to one embodiment.

FIG. 19 is an exemplary level and control signal of a sticky valve without compensation according to one embodiment.

Figure 20:
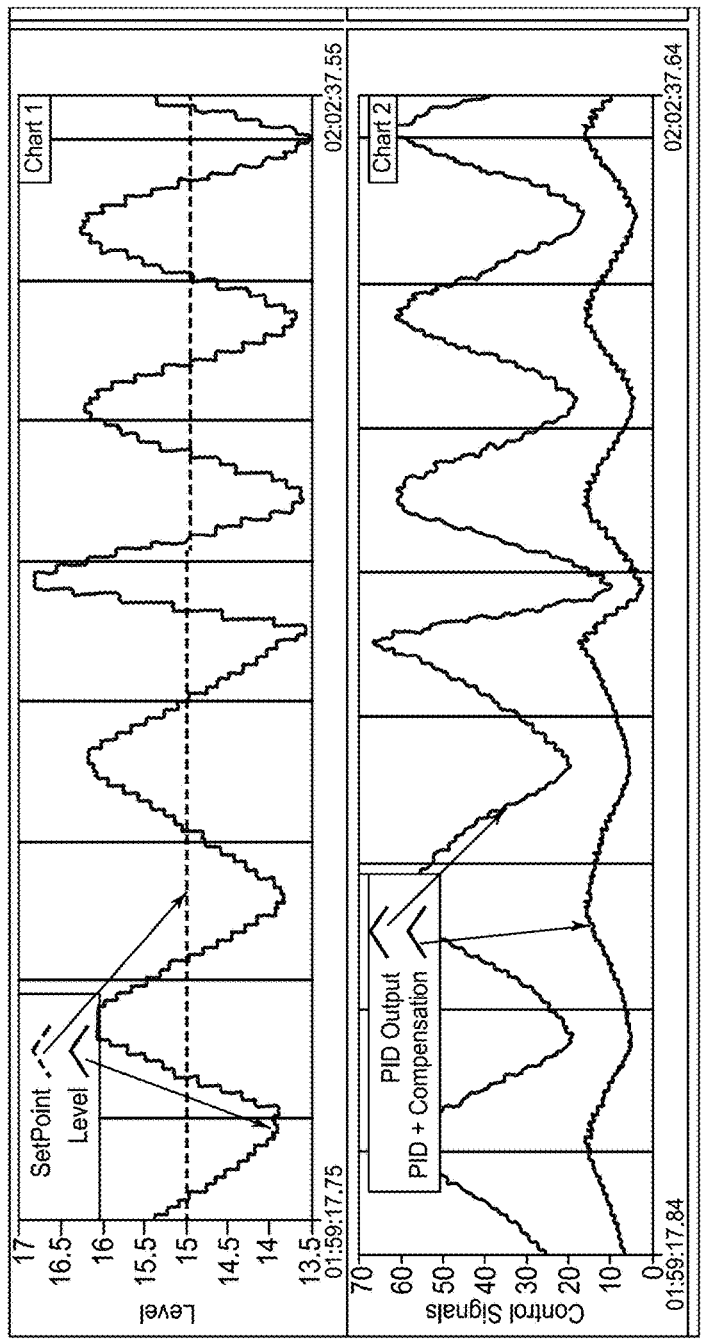
FIG. 20 is an exemplary level and control signal of a sticky valve with compensation with 3 iterations according to one embodiment.

FIG. 20 is an exemplary level and control signal of a sticky valve with compensation with 3 iterations according to one embodiment.

Figure 21:
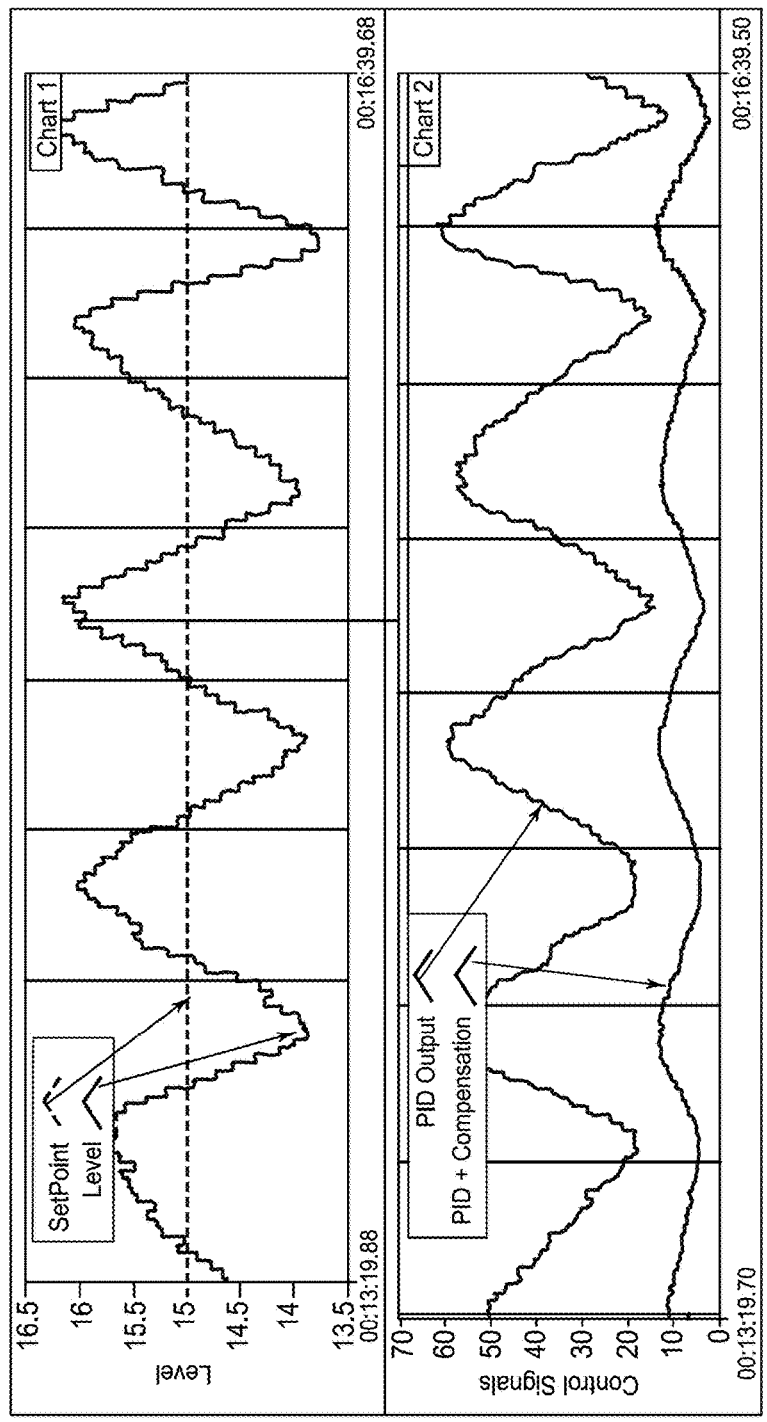
FIG. 21 is an exemplary level and control signal of a sticky valve with compensation with 8 iterations according to one embodiment.

FIG. 21 is an exemplary level and control signal of a sticky valve with compensation with 8 iterations according to one embodiment.

The differential evolution (DE) filter achieved 60% oscillation reduction in the process variable (tank level) with three (3) iterations only (FIG. 20), and up to 77% with eight (8) iterations (FIG. 21). Further, the smooth control signal after the compensation algorithm according to the present embodiment will extend the valve life time.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present system in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present system are possible in light of the above teachings. It is therefore to be understood that within the scope of the appended claims, the system may be practiced otherwise than as specifically described herein.

The invention claimed is:

1. A pneumatic valve system comprising:
   an actuator that pneumatically actuates a valve;
   a positioner to detect a position of the valve to output position information of the valve;
   at least one of a flow transmitter to detect flow information and a level transducer to detect tank level information; and
   circuitry configured to:
      calculate a control signal to control the actuator by compensating for nonlinear dynamic of the actuator using a stable inverse model of the valve; and
      control the actuator using the control signal calculated based on parameters of the stable inverse model such that a difference between the position information of the valve and desired reference information is reduced, the parameters being calculated based on system degradation of the pneumatic valve system;
   wherein the valve and the at least one of the flow detector and the level transducer are in fluid communication.

2. The pneumatic valve system according to claim 1, wherein the nonlinear dynamic of the actuator is caused by a static friction of the valve.

3. The pneumatic valve system according to claim 1, wherein the nonlinear dynamic of the actuator is caused by a stick and jump behavior of the valve.

4. The pneumatic valve system according to claim 1, wherein a finite impulse response filter is used to calculate the control signal.

5. The pneumatic valve system according to claim 1, wherein the circuitry optimizes the parameters of the stable inverse model to reduce a cyclic behavior in the control signal.

6. The pneumatic valve system according to claim 1, wherein the circuitry optimizes the parameters of the stable inverse model using a differential evolution algorithm.

7. The pneumatic valve system according to claim 1, wherein the circuitry optimizes the parameters of the stable inverse model using at least one of a genetic algorithm, a particle swarm optimization algorithm, and an ant colony optimization algorithm.

8. The pneumatic valve system according to claim 1, wherein the circuitry optimizes the parameters of the stable inverse model to adjust to unknown nonlinear dynamics based on information received via network.

9. The pneumatic valve system according to claim 1, further comprising a pneumatic supplier that supplies pneumatic pressure to the actuator, and an electrical to pressure converter that controls the pneumatic pressure based on the control signal.

* * * * *